United States Patent
Zaher et al.

(10) Patent No.: US 7,519,900 B2
(45) Date of Patent: Apr. 14, 2009

(54) SYSTEM AND METHOD FOR PROCESSING DIGITAL ANNOTATIONS

(75) Inventors: Maged N Zaher, Bellevue, WA (US); Axel Kramer, Kirkland, WA (US); Rafael R Ruiz, Seattle, WA (US); David M Bargeron, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 10/966,950

(22) Filed: Oct. 15, 2004

(65) Prior Publication Data

US 2005/0091027 A1    Apr. 28, 2005

Related U.S. Application Data

(60) Provisional application No. 60/514,443, filed on Oct. 24, 2003.

(51) Int. Cl.
*G06N 3/00* (2006.01)
(52) U.S. Cl. ..................................................... 715/230
(58) Field of Classification Search ............... 715/512, 715/501.1, 530, 513, 517, 523, 230, 231, 715/232, 233
See application file for complete search history.

(56) References Cited

U.S. PATENT DOCUMENTS

| | | | |
|---|---|---|---|
| 6,687,876 B1 * | 2/2004 | Schilit et al. | 715/512 |
| 7,275,063 B2 * | 9/2007 | Horn | 707/102 |
| 2002/0099552 A1 * | 7/2002 | Rubin et al. | 704/270 |
| 2004/0161150 A1 * | 8/2004 | Cukierman et al. | 382/186 |
| 2004/0260929 A1 * | 12/2004 | Albornoz et al. | 713/176 |
| 2004/0267798 A1 * | 12/2004 | Chatterjee et al. | 707/102 |
| 2006/0212795 A1 * | 9/2006 | Cottrille et al. | 715/512 |

* cited by examiner

*Primary Examiner*—Stephen S Hong
*Assistant Examiner*—Kyle Stork
(74) *Attorney, Agent, or Firm*—Workman Nydegger

(57) ABSTRACT

According to an aspect of the present invention, a method for storing a digital annotation is provided. The method includes obtaining a notification of a creation of a digital annotation and identifying an anchor associated with the digital annotation. Once the digital annotation has been received and the anchor identified, a resource: locators representative of a location of the anchor is stored. The resource: locators includes a locator that contains at least one locator part. Additionally, a determination is made as to whether there is a content associated with the digital annotation, and if so, a resource: contents representative of the content associated with the digital annotation is stored.

21 Claims, 12 Drawing Sheets

SYSTEM AND METHOD FOR PROCESSING DIGITAL ANNOTATIONS

CROSS-REFERENCE TO RELATED APPLICATION

This application claims the benefit of United Stated Provisional Application No. 60/514,443, filed Oct. 24, 2003, titled ANNOTATION OBJECT MODEL, which is incorporated by reference herein.

FIELD OF THE INVENTION

In general, the present invention relates to computer software and computer information storage, and in particular, to a system and method for processing digital annotations.

BACKGROUND

Advancements in computing devices, networks, storage devices, and digital inputs for computing devices has increased the variety of ways in which a user can interface with digital information. In particular, users now have the capability to digitally annotate, or mark up, electronic data. An "annotation," as used herein, is additional data a user may anchor or associate with some original information. To "anchor" an annotation, as used herein, means to fix the annotation so that its association relative to some portion of original content remains the same. Typical examples of an annotation in the physical world are sticky notes attached to a document, the "sign here" flag attached to a document, bookmarks, pen scribbles on a document, etc. Digital annotations are similar to physical annotations except that they are associated with electronic data.

Not only has the advancement of computing technology provided individuals with the ability to digitally annotate documents, the improvement in computer networking has provided users with the increased ability to transfer digital content and to interact with multiple users connected to a network, such as the Internet. For example, a user in California can digitally annotate a document and e-mail that document with the digital annotation to an individual in New York, who may then view the document and the digital annotation.

Although users can digitally annotate digital content, current digital annotation techniques are limited in their flexibility and storage structure. Typically, digital annotations may only be anchored to one location within a document. Additionally, current digital annotation techniques do not store together an anchor and the content around the anchor. Not storing an anchor and the content around the anchor together requires that the digital annotations remain tied to the original information. This limits a user's ability to share portions of information, and to query digital annotations from multiple sources of information. For example, if a user has digitally annotated multiple different sources of information, such as two digital documents and a spreadsheet, the user may only search for digital annotations within each document individually. Still further, to query existing digital annotations, a user is required to query the original information source that contains the digital annotation. A user who does not have access to the original source of information does not have the ability to search for digital annotations that may be present.

Thus, based on the above-mentioned problems associated with existing digital annotation techniques, there is a need for a system and method that overcomes the deficiencies of existing digital annotation technology and provides an annotation object model that enables digital annotations where anchors and content around the anchors may be stored and represented at the same time and independent of the original information. Also desirable is a system and method that allows for multiple anchors for a single digital annotation. Still further, a system and storage structure is needed that provides users the ability to search for and view digital annotations independent of the original source of information.

SUMMARY

According to an aspect of the present invention, a method for storing a digital annotation is provided. The method includes obtaining a notification of a creation of a digital annotation and identifying an anchor associated with the digital annotation. Once the digital annotation has been received and the anchor identified, a resource object representative of a location of the anchor is stored. The resource object includes a locator that contains at least one locator part. Additionally, a determination is made as to whether there is any content associated with the digital annotation, and if so, a resource object representative of the content associated with the digital annotation is stored.

According to another aspect of the present invention, an annotation object model for storing a digital annotation is provided. The annotation object model includes an annotation class, a resources class, and a locators class. The annotation class includes an author identification, identifying an author of the digital annotation, and at least one reference to a collection of resource objects. The resources class is configured to identify the anchor or the cargo of the digital annotation. The locators class includes at least one locator part. Each of the locator parts serve to locate the annotation's association with the content.

According to still another aspect of the present invention, a method for querying for an existing digital annotation is provided. The method includes receiving a query parameter, determining a query type, and querying an annotation store for annotation objects matching the query parameter. The results returned from the query are compiled and at least one digital annotation that matches the query parameters is returned.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
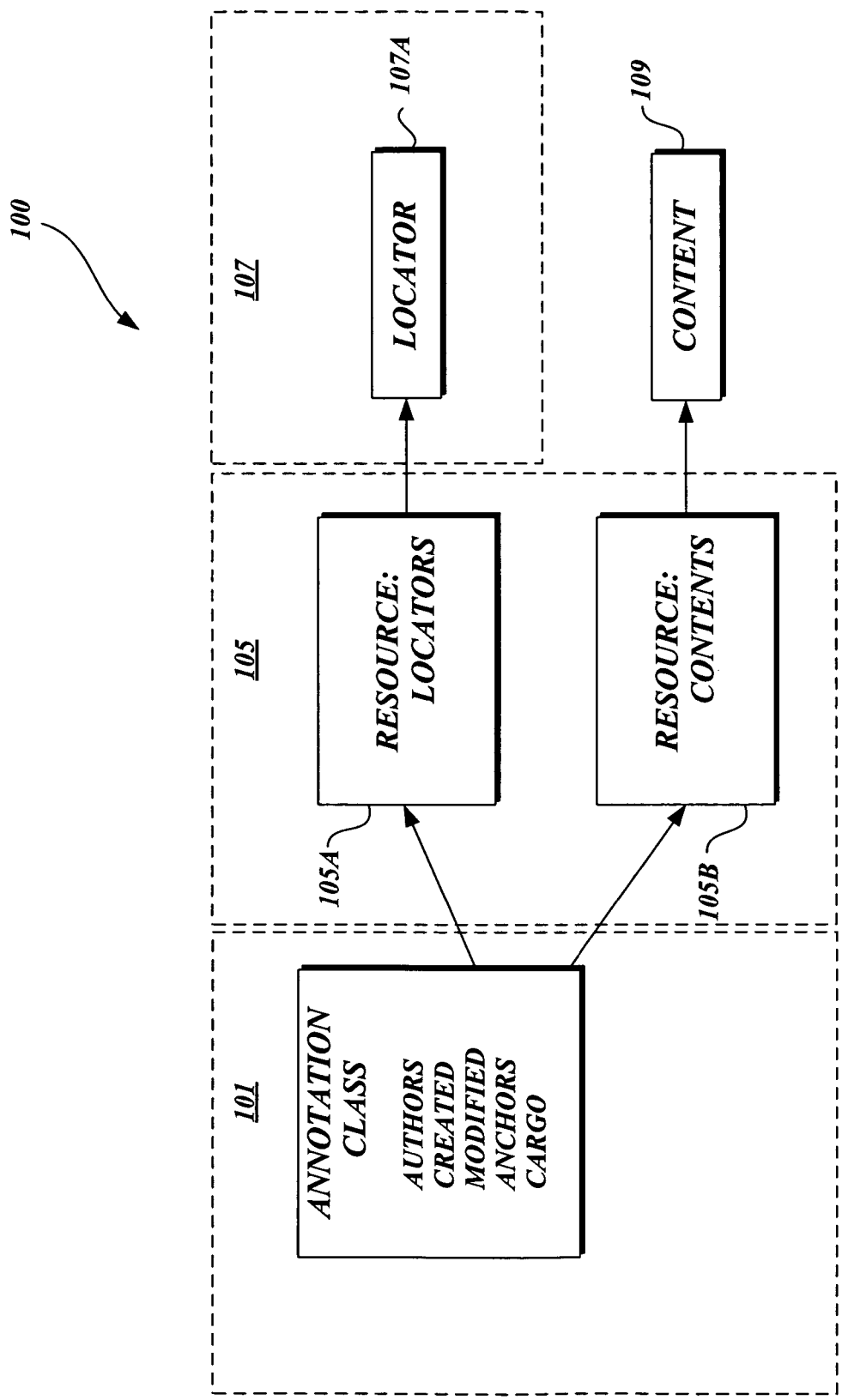
FIG. 1A is a block diagram illustrative of a general annotation object graph that may be utilized to represent any type of digital annotation, in accordance with an embodiment of the present invention.

Generally described, the present invention relates to a system and method for processing digital annotations. Processing can include, but is not limited to, creating, modifying, storing, and querying. In one aspect, digital annotation anchors, the annotation content of those anchors, and potentially the content surrounding those anchors (annotated content) may be stored together so that the digital annotation may be accessed, modified, and/or queried independent of the original information. In another aspect, the present invention may also provide for digital annotations with multiple anchors and multiple types of annotation content and annotated content. Additionally, queries may be performed on existing digital annotations resulting in the return of digital annotations, and the annotated content associated with those digital annotations, matching the query parameters.

As a result of the different aspects of the present invention, digital annotations may be associated with a specific portion, or portions, of electronic data, regardless of the format of the data and/or the storage location of the data. Additionally, in an example of a networked computing system, a user may create digital annotations within electronic data residing on a computing device at a first location. The digital annotations may be queried and obtained by a computing device at a second location, regardless of whether the computing device has direct access to the original data. In such an example, not only is the digital annotation accessible, but a user without the original data may also obtain the annotated content, thereby providing context to the digital annotation.

As will be appreciated, embodiments of the present invention may be utilized to digitally annotate any type of electronic data. For example, digital annotations may be created on a digital document, audio, spreadsheet, image, video, e-mail, slide presentation, or any other form of electronic data. While any form of digital data may be utilized by embodiments of the present invention, for consistency and ease of explanation, the example of a digital document (referred to herein as a "document") will be utilized. The use of documents to describe examples and embodiments of the present invention is not intended to limit the scope of the present invention in any way and it will be understood that embodiments of the present invention are equally applicable to any type of electronic data.

Embodiments of the present invention expand the scope of types of possible digital annotations to include any form of digital metadata that is added to a document which does not change the content integrity of the document. For example, a digital annotation may be, but is not limited to, a digital "sticky note" (en electronic note included inside a document), a text comment, a snippet, inking in the margin of a document, a margin-bar (vertical indication next to content), highlights over existing content of a document, symbols, underlines, bookmarks (a pointer into some content that helps a user navigate and re-find a particular location), a hyperlink to some other document that the user has added to a document and annotated grouping or annotated relationships (a user might select the number of files and add a comment to that group, or the user might underline two sections in a document and connect both with one margin note). Processing (e.g., creation, storage, and querying) of exemplary digital annotations will be described in further detail below.

FIG. 1A is a block diagram of an annotation object model graph 100 that may be utilized to represent any type of digital annotation, in accordance with an embodiment of the present invention. An annotation object model graph 100 includes three objects: an annotation object 101, two resources objects 105, and a locators object 107. Utilizing those three object types (i.e. classes), any type of digital annotation may be represented and stored regardless of the different combinations of data within each class. For example, the annotation object model graph 100 provides the ability to store annotation objects representative of digital annotations such as text comments, snippets, etc., which require different combinations from the locators class and the resources class. Utilizing the three abstract classes to define all digital annotations provides an object model that is concrete, but flexible.

As described in more detail below (FIG. 1B), the annotation class 101 which defines the digital annotation itself, includes information about the annotation, anchor resources for the annotation and cargo resources for the annotation. Anchor resources represent what the annotation is anchored on and cargo resources represent the content of the annotation. The resources are defined by the resource objects 105. Instances of resource objects include resource: locators 105A and a resource: contents 105B. The resource: locators 105A represents the characterization of the annotated content with which the annotation is associated, and possibly the "annotated content". The resource: contents 105B represents the "annotation content." Annotation content, as used herein, is content that defines the digital annotation, such as the text of a textual comment, the digital ink strokes of a hand drawn underline, the audio data from a spoken comment, etc. Annotated content, as used herein, is content from a document that has been annotated or is associated with a digital annotation. For example, consider a digital text bubble annotation that is anchored to the last name of a person in a human resources application. The resource: locators 105A contains a reference to the last name for the given employee, and the resource: contents 105B may contain the text of the text bubble annotation (annotation content).

When a resource refers to a location, it is expressed with a locator 107A, which will be described in greater detail below. When a resource contains content directly, it is expressed by the content itself 109. When resources provide both reference and content, the digital annotation is expressed using both a locator 107A and content 109. Utilizing resources that contain both a locator 107A and the content 109 may be beneficial when a user wants to keep a reference to a document as well as a particular portion of the document itself. For example, it may be beneficial for clipping annotations to keep a reference to the clipping source (the original document) as well as a copy of the content of the clipping.

Additionally, an annotation object may include multiple references to a document, multiple references to multiple documents, and contain multiple contents as literal representations of the information that is referenced. In such embodiments, the annotation object model graph 100 may include any number and combination of resource: locators, resource: contents, locators, and content. For example, the locator 107A of the resource: locators 105A for a digital sticky note annotation may identify the location of the anchor of the sticky note; the locator 107A for a digital highlight annotation may express where the highlight is, etc. A resource containing a locator can also be used for content. This supports two scenarios. One, using preexisting data as the annotation content, e.g., an image attached to a paragraph, and two, leveraging native storage for well-known media types, e.g., an audio note as annotation content becomes an audio item instead of being literally represented in a digital annotation.

Figure 1B:
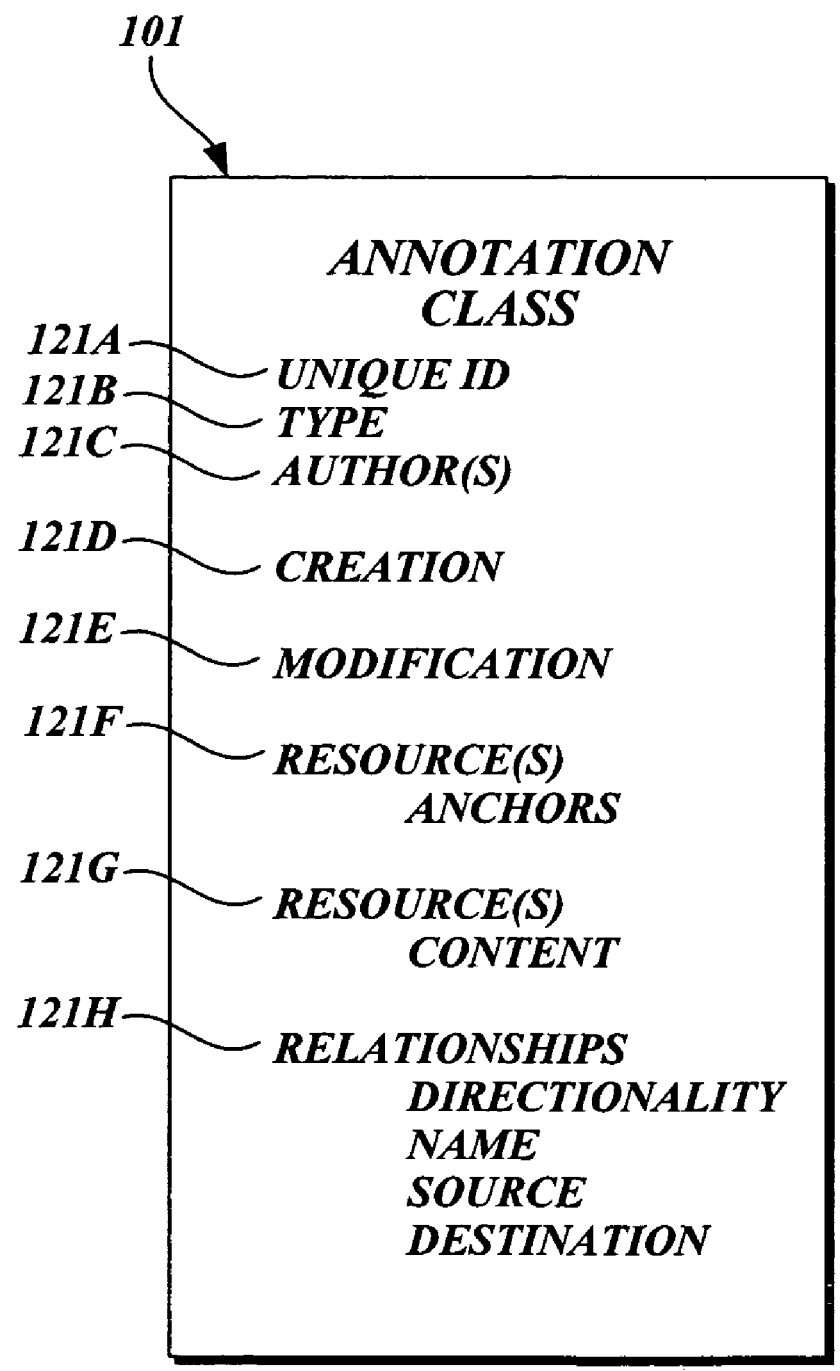
FIG. 1B is a block diagram illustrating details of the annotation class of the annotation object graph illustrated in FIG. 1A, in accordance with an embodiment of the present invention.

FIG. 1B illustrates the annotation class 101 of the annotation object model graph 100 illustrated in FIG. 1A, in accordance with an embodiment of the present invention. Structurally the annotation class 101 typically includes a unique digital annotation identification ("unique ID") 121A, a digital annotation type 121B, the digital annotation authors 121C identifying who created and/or changed the digital annotation, a creation date and time 121D, a modification date and time 121E, a reference to a collection of resources for anchors 121F of a digital annotation, a reference to a collection of resources for content 121G of the digital annotation, and relationships 121H.

Relationships 121H express how anchors and content relate to one another. A relationship 121H may structurally include directionality (unidirectional or bidirectional), a name of the relationship, a source, and a destination. For example, a relationship 121H may identify a digital hyperlink annotation in a document that refers to some other document. Such a link is identified by directionality. Relationships 121H may also identify directionality between anchors and the annotated content. For example, an ink scribble might indicate arrows from the annotated content to a margin bar and from a margin bar to other annotated content.

Figure 1C:
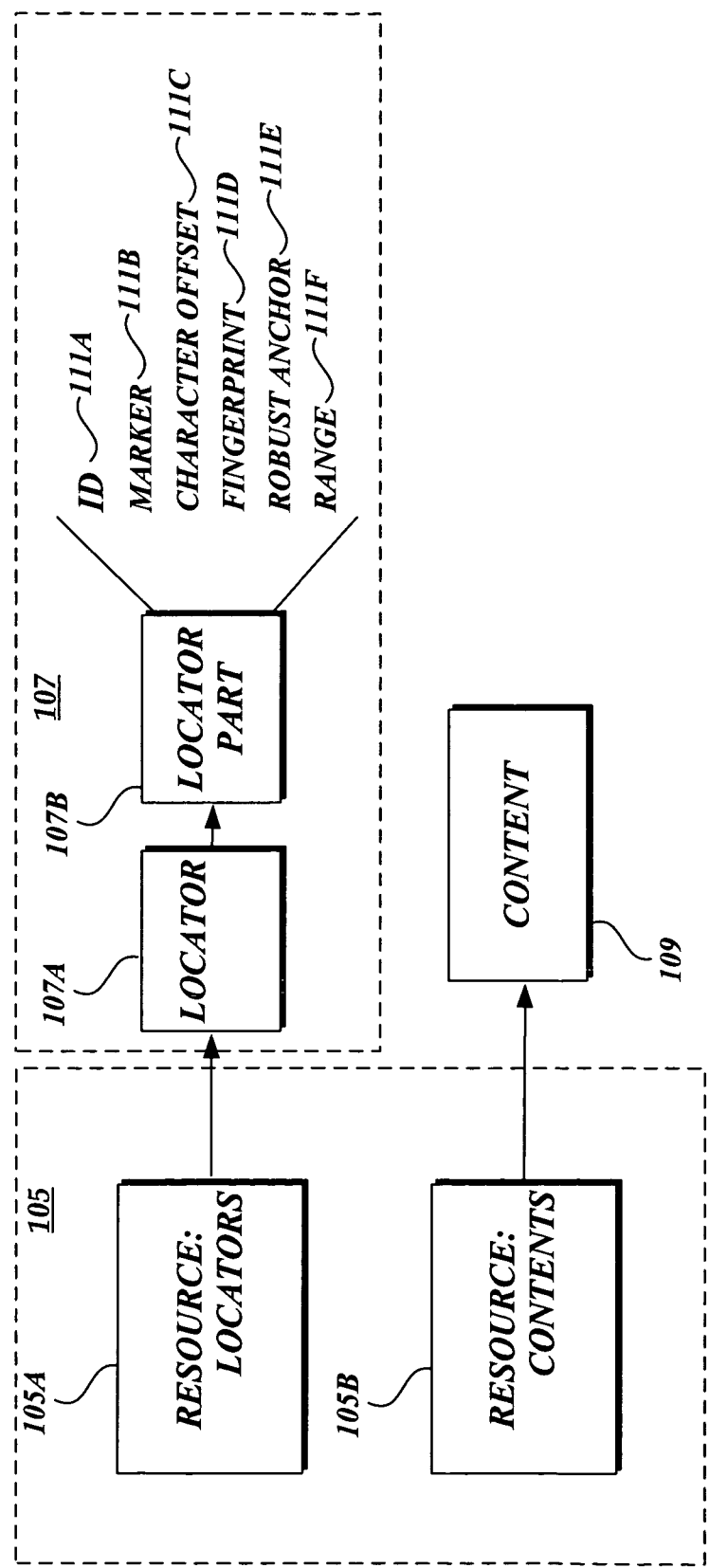
FIG. 1C is a block diagram illustrating details of a resources object and a locators object of the annotation object graph of FIG. 1A, in accordance with an embodiment of the present invention.

Referring to FIG. 1C, resources of the resource class may be used to represent either anchors or cargo of an annotation. For example, an instance of a resource may identify the location of an annotation's anchor (resource: locator) and another instance of a resource may identify the content type of the annotation (resource: content). Structurally, objects of the resource class, such as resource: locators 105A, may include a locator 107A. Alternatively, objects of the resource class may include content 109. A locator 107A, as defined by the locator class, describes the location or the identification of a particular item of information. Each locator 107A may contain zero or more locator parts, such as locator part 107B. Any number of locator parts may be contained within a locator 107A. Each locator may include one or more representations. Each representation may be considered as referring to the same item. For example, each representation may refer to the annotated content with which the annotation is associated. However, each representation may express an alternative way of referring to this annotated content.

Locator parts may represent, but are not limited to: an identification of a digital annotation 111A, a marker 111B, a character offset 111C, a fingerprint 111D, a robust anchor 111E, and a range 111F. An identification 111A provides a unique identification for the locator 107A. A marker 111B provides an embedded unique identification for the locator 107A. A character offset 111C identifies the distance of the digital annotation from a particular location, such as the beginning of the document. Fingerprints 111D contain a unique hash-code for information associated with a digital annotation to identify the information. A robust anchor 111E determines anchoring by best statistical fit location based on key words and information saved with an anchor of the annotation. One skilled in the relevant art will appreciate that additional or alternative locator parts may be included in the locator 107A.

Each locator part 107B is compared against data that is determined by evaluating the locator parts that precede it in the locator 107A. For example, a group of locator parts that make up a locator 107A may identify a location within a document where an annotation belongs. For instance, the locator \\ABCD\public\misc.doc#3rdParagraph indicates that an annotation is associated with the third paragraph of the document misc.doc located in the \public directory on the \\ABCD server. \\ABCD, \public, misc.doc, and 3rdParagraph are each locator parts that make up the locator \\ABCD public\misc.doc#3rd Paragraph.

In one embodiment, the data itself for each locator part 107B may be expressed in Extensible Markup Language ("XML") that conforms to a given type of an XML Schema Definition ("XSD schema"). In such an example, the locator part 107B structurally contains an XML Schema Identifier ("XSI type name"), identifying the XML schema type the data adheres to, a name space identifying the name space for the schema type, and data in XML representing the locator part. The use of XML and associated schemas is only an exemplary description, and any other language or schema type may be utilized with embodiments of the present invention. For example, the data for a locator part 107B may be represented in SGML.

With continued reference to FIG. 1C, structurally, the resource: contents 105B may contain content 109 that represents annotation content. In one embodiment, annotation content contained within the content 109 may conform to a given type of an XSD schema. In such an example, the content 109 structurally contains an XSI type name, identifying the XML schema type the data adheres to, and a name space Uniform Resource Identifier ("URI"), and the data itself in XML representing the annotation content. Examples of annotation content include, but are not limited to, text, images, ink, audio, Extensible Hyper-text Markup Language ("XHTML"), Transaction Authority Markup Language ("XAML"), video, spreadsheets, documents, etc.

Figure 2A:
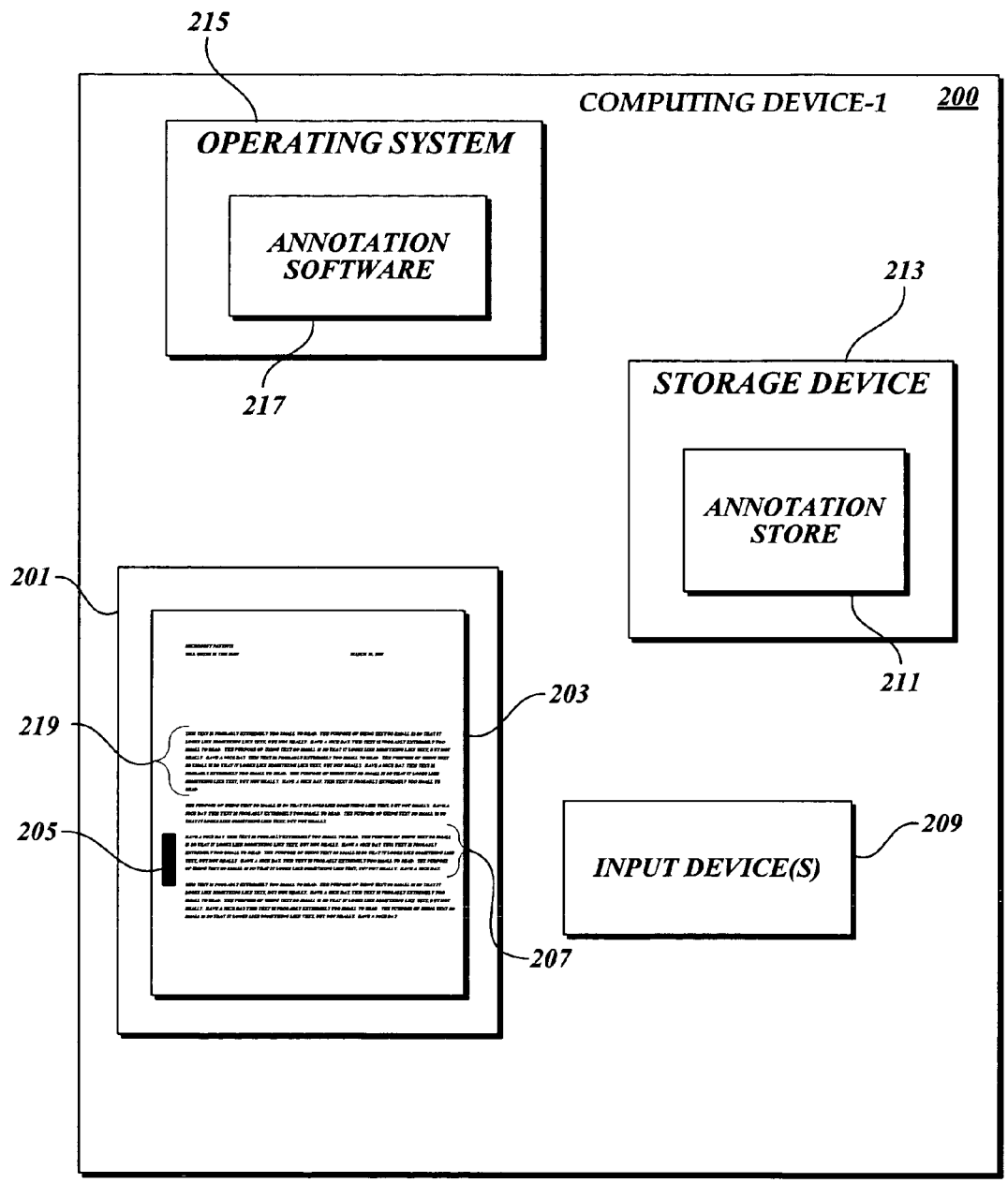
FIG. 2A is a block diagram of a computing system that may be used for processing digital annotations, in accordance with an embodiment of the present invention.

FIG. 2A illustrates a computing device-1 200 which may be used for processing digital annotations on a document, such as a margin-bar 205, in accordance with an embodiment of the present invention. The computing device-1 200 may be embodied as any one of a variety of computing devices that may be utilized for processing digital annotations. Examples of the computing device-1 200 include, but are not limited to, personal computing devices, handheld computing devices, server-based computing devices, personal digital assistants, mobile telephones, stand-alone memory devices, electronic devices having some type of memory, whether external or internal, removable or permanent, and the like.

In one embodiment of the present invention, the computing device-1 200 includes a storage device 213, a display 201, and one or more input devices 209. Also included in the computing device-1 200 is an operating system 215. Any type of operating system may be used with embodiments of the present invention. The operating system 215 of the computing device-1 200 may be used to control and execute digital annotation software 217 for performing different aspects of the present invention. In an illustrative embodiment of the present invention, the digital annotation software 217 may be a stand-alone software product. Alternatively, the digital annotation software 217 may be a software component integrated into other software products.

With continuing reference to FIG. 2A, a user (not shown) may view a document 203 on the display 201. Using an input device 209, such as a mouse pointer, a user can create a digital annotation 205 on the document 203. The digital annotation 205 is anchored to information within the document 203 that is proximate to the digital annotation 205. That information becomes annotated content 207. In an embodiment of a single computing device, such as computing device-1 200, the digital annotation 205 and the annotated content 207 to which it is anchored are represented as an annotation object, according to the annotation object model graph 100, and stored in an annotation store 211 contained on a storage device 213. In an alternative embodiment, the digital annotation 205 and a reference to the annotated content 207 is represented as an annotation object, according to the annotation object model graph 100, and stored in the annotation store 211. Storing an annotation object representative of the digital annotation 205 and the annotated content 207, or a reference to the annotated content 207, provides the user with the ability to perform several different functions with respect to the digital annotation 205 and the annotated content 207.

For example, after creation of the digital annotation 205, a user, at a later time, can view the document 203 and the digital annotation 205 would be represented on that document at the location it was originally created. Additionally, a user wanting to find the digital annotation 205 can perform a query on the annotation store 211 and the resulting digital annotation 205 and the associated annotated content 207 will be returned to the user either within the document 203 or independent of the document 203. Still further, a user can modify the digital annotation 205. For example, a user can expand the size of the digital annotation 205, thereby increasing the amount of annotated content 207. A user can delete the digital annotation 205, thereby removing the annotation object representative of the digital annotation 205 and the annotated content 207 from the annotation store 211 which resides on the storage device 213. Still further, a user can associate the digital annotation 205 with yet another portion of the document 203. For example, the user can anchor the digital annotation 205 to a second set of information within the document 203 such as text 219. The second set of information within the document 203 also becomes annotated content. Providing multiple anchors for a digital annotation increases the flexibility with which a document may be annotated.

Figure 2B:
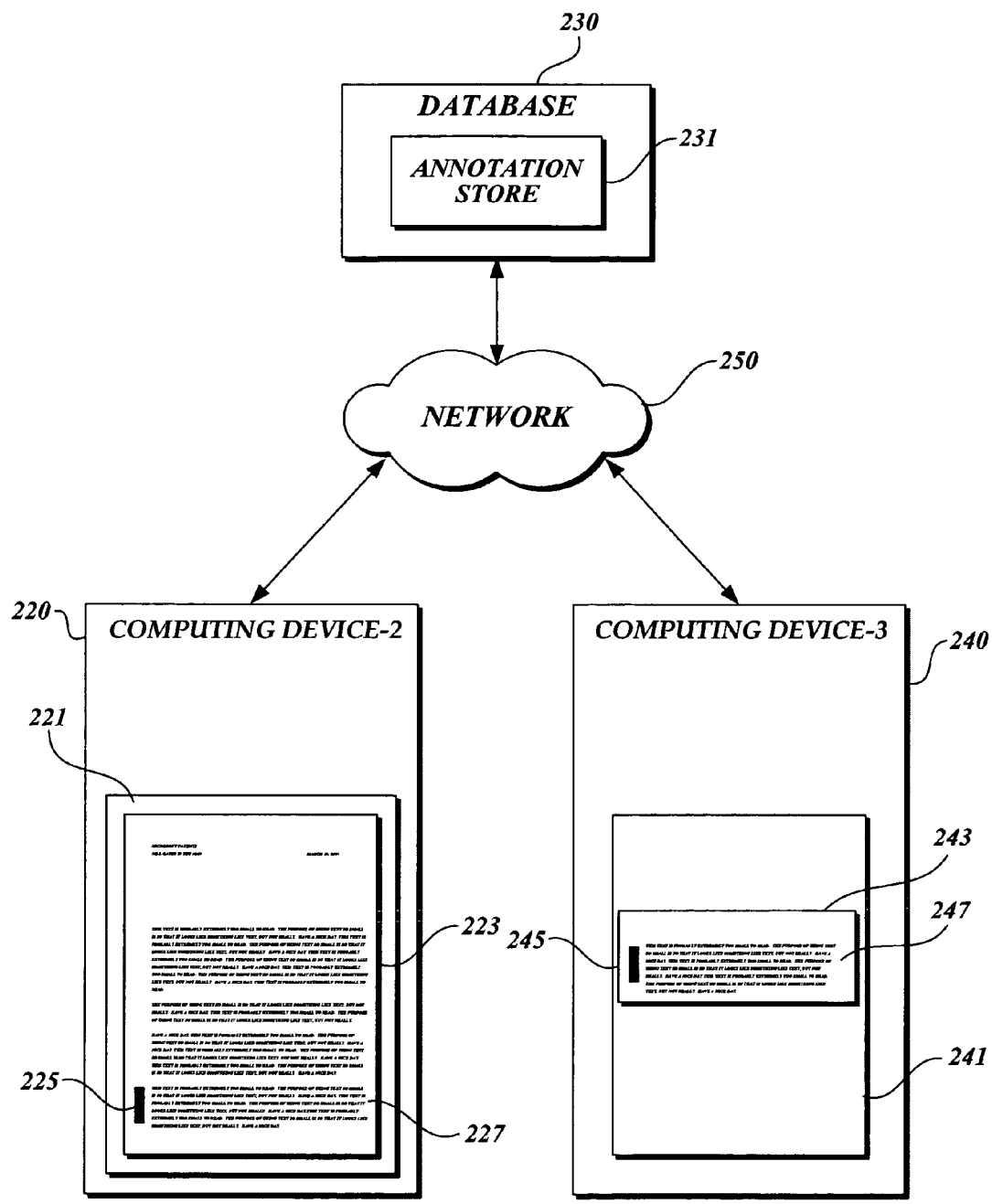
FIG. 2B is a block diagram of networked computing devices for processing digital annotations, in accordance with an embodiment of the present invention.

FIG. 2B illustrates an alternative embodiment of the present invention. Similar to the embodiment described with reference to FIG. 2A, the system illustrated in FIG. 2B includes a network of several computing devices 220, 230, 240. Computing devices 220 and 240 may be similar to computing device-1 200 (FIG. 2A) and include displays 221, 241, as well as input devices (not shown), an operating system (not shown), and possibly a storage device (also not shown). In the embodiment illustrated in FIG. 2B, the computing device-2 220 is connected to a network 250, such as the Internet or a private network, which may also be connected to any number of additional computing devices, such as computing device-3 240. Additionally, the computing device-2 220 may also be networked with a database 230 which may include an annotation store 231, similar to the annotation store 211 illustrated in FIG. 2A. Locating the annotation store 231 on the database 230 which is networked with multiple computing devices 220, 240 through the network 250 provides the ability for any of the multiple computing devices to search for and access digital annotations created at any of the computing devices, such as computing device-2 220 and/or computing device-3 240.

In an alternative embodiment, the computing devices 220, 240 may be integrated to share storage devices residing on those computing devices, thereby providing the ability for one computing device, such as computing device-2 220, to search the storage device of a second computing device, such as computing device-3 240, for existing annotation objects located on one of those computing devices.

With continuing reference to FIG. 2B, a user may create a digital annotation 225 which is anchored to information of a document 223. That information becomes annotated content 227. The digital annotation 225 and the associated annotated content 227 are defined by an annotation object, according to the annotation object model graph 100, and may be transferred from computing device-2 220 through the network 250 and stored in the annotation store 231 on the database 230. In such an embodiment, the digital annotation 225 may be generated and the associated annotation object which is stored on the annotation store 231 is created using techniques similar to those described with respect to FIG. 2A, and as described in further detail below.

In a networked embodiment, a user at a separate computing device, such as computing device-3 240, may query the annotation store 231, via the network 250, for an annotation object. For example, a user at computing device-3 240 may query the annotation store 231 for all annotation objects representative of digital annotations that are in the form of a margin bar within a document. The results of that query would return a digital annotation 245 with annotated content 247 which is representative of the digital annotation 225 created on computing device-2 220 and the annotated content 227 associated with that digital annotation 225. The digital annotation 245 and the associated annotated content 247 may be provided to a user at computing device-3 240 regardless of whether that user has a copy of the original document 223 on which the original digital annotation 225 was created. Additionally, the user at computing device-2 220 may query the annotation store 231 via the network 250 for any existing annotation objects representative of a digital annotation, and be provided with the option of viewing the digital annotation within the original document or alternatively, view the digital annotation and the associated annotated content independent of the document.

In yet another embodiment, a combination of the embodiments described with reference to FIG. 2A and FIG. 2B may be realized. In particular, digital annotations created on one computing device, such as computing device-1 200 (FIG. 2A) and/or computing device-2 220 (FIG. 2B), may have the representative annotation object according to the annotation object model graph 100 stored on a local storage device, such as storage device 213, and also stored in a network based annotation store 231 residing on a database 230. Regardless of where the annotation object representing a digital annotation, such as digital annotation 205, is stored, as described above, the annotation object model graph itself, and resulting instances of annotation objects, remain concrete, but flexible.

Figure 3:
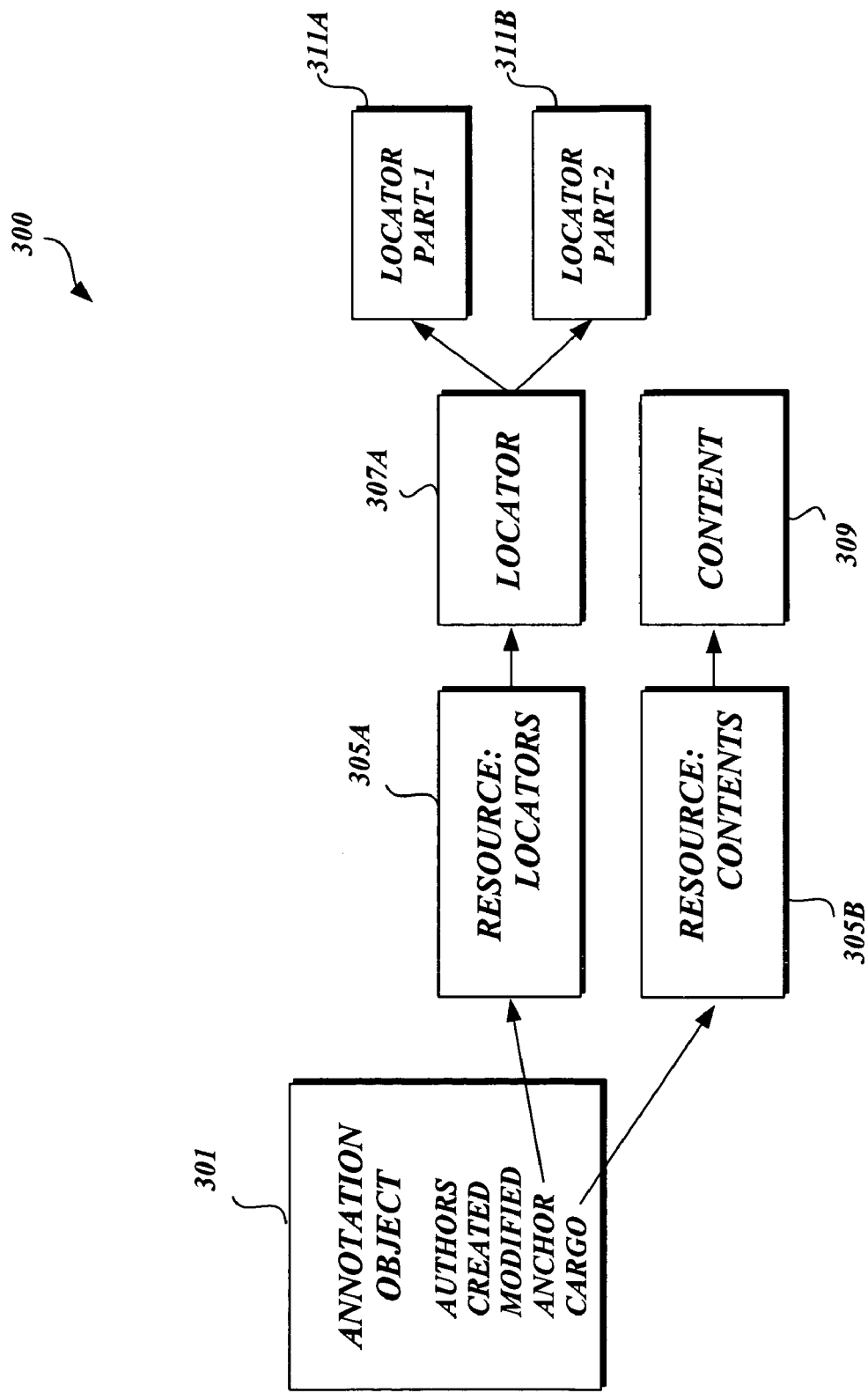
FIG. 3 is a block diagram illustrating an instance of an annotation object, as part of the annotation object graph, of a digital annotation having one anchor, in accordance with an embodiment of the present invention.

FIG. 3 is a block diagram illustrating an example of an instance of annotation object 301, as part of the annotation object graph 300, for a digital annotation having only one anchor. For example, a digital annotation having only one anchor may be, but is not limited to, a bookmark, which is a pointer to some location within a document. A user typically creates bookmarks to assist in navigation within a larger document. Even though an annotation object 300 for a digital bookmark annotation in its simplest form only contains one anchor, thereby necessitating only one resource: locators 305A, the locator 307A of the annotation object 300 typically includes more than one locator part, since the bookmark is pointing into a document. For example, the locator 307A may include two locator parts, locator part-1 311A and locator part-2 311B. In particular, locator part-1 311A identifies a document to which the digital bookmark annotation is associated, while locator part-2 311B identifies the particular location within the document where the digital bookmark annotation is anchored. For example, if the document is named document1.doc and the annotation is in the fourth paragraph, locator part-1 311A is document1.doc and locator part-2 311B is 4thParagraph.

In addition to the annotation object 300 containing one anchor which refers to resource 305A with locator 307A, the cargo of the annotation object 300 refers to a collection of resources that describe the content of the digital annotation itself, in this example, a bookmark. In particular, the cargo of the annotation object 300 references the resource: content 305B which includes the content 309 of the annotation. In an alternative embodiment, for structured annotations such as bookmarks, the annotation object may not include the content of the annotation type but instead refer to the type of annotation. Additionally, the annotation object 301 typically includes the author that created the digital annotation, the date and time it was created, and a date and time if it was modified.

Figure 4:
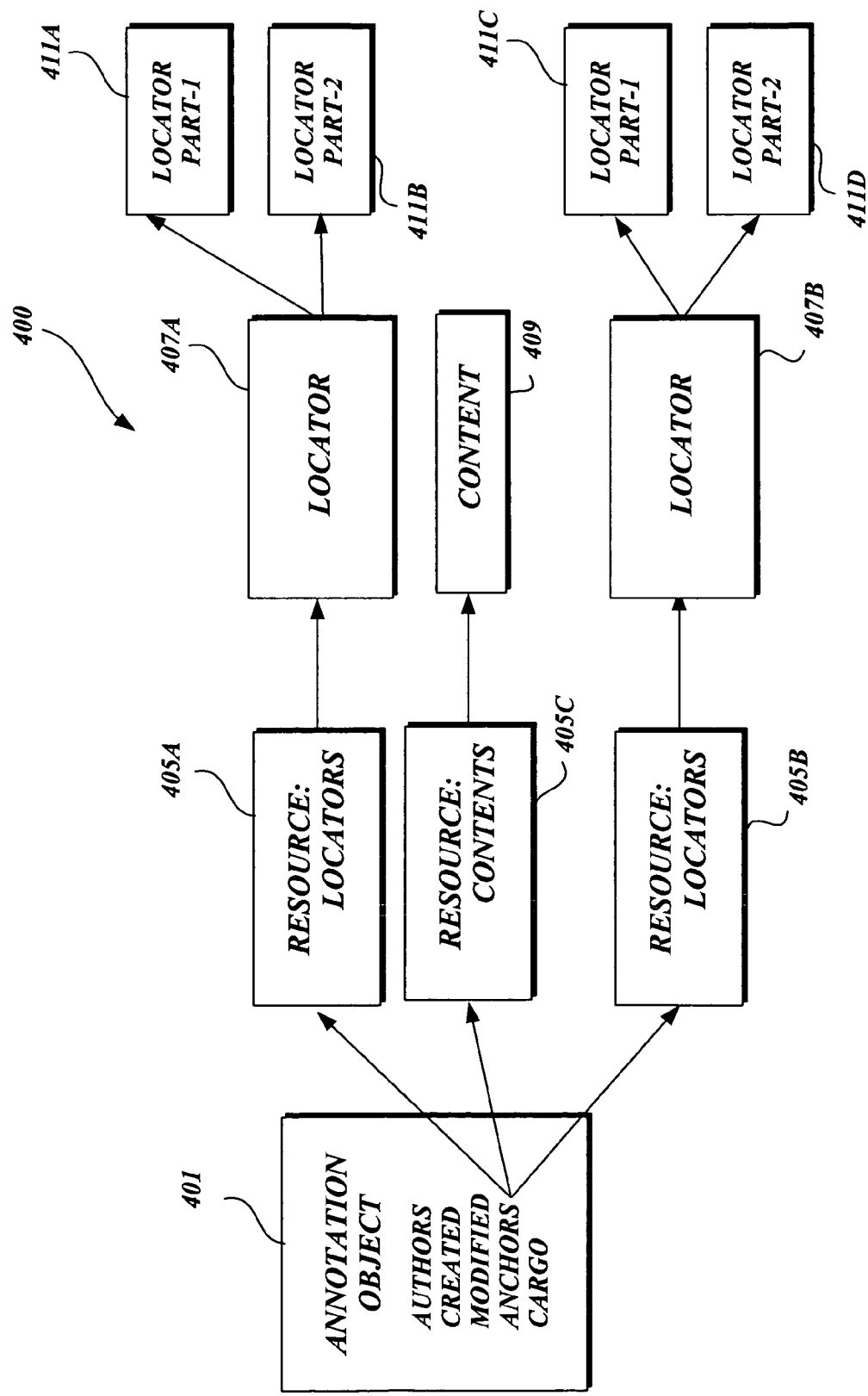
FIG. 4 is a block diagram illustrating an instance of an annotation object, as part of the annotation object graph, of a digital annotation having two anchors, in accordance with an embodiment of the present invention.

FIG. 4 illustrates a block diagram of an instance of annotation object 401, as part of the annotation object graph 400, representing a digital annotation that has two anchors, such as a digital hyperlink annotation. In the example of a digital hyperlink annotation, the two anchors are a source and a destination of the hyperlink. In order to adequately define digital annotations having two anchors, each anchor of the annotation object refers to a collection of resources. In particular, the instance of the source anchor refers to the resource: locators 405A and the instance of the destination anchor refers to the resource: locators 405B. The resource: locators 405A, for the hyperlink example, is defined by a locator 407A, that is typically positioned within some subpart of a document. Thus, there are at least two locator parts, locator part-1 411A, and locator part-2 411B. Locator part-1 411A identifies the document in which the source anchor of the digital annotation was created and locator part-2 411B identifies the particular location of the source anchor within that document.

The destination anchor, represented by locator 407B, may also have one or more locator parts. The number of locator parts identifying a destination anchor is dependent upon whether the destination is identified as a whole or as a part. For example, the destination anchor of the digital annotation may be to another document itself, identified as a whole, thereby only needing one locator part 411C to identify the destination document. If the destination anchor is to a particular location within the same document as the source anchor, it may be sufficiently identified with one locator part defining the particular location of the destination anchor within the original document. Alternatively, if the destination is a particular location within another document, the locator 407B may include at least two locator parts for the destination anchor, one locator part 411C identifying the destination document and the second locator part 411D identifying the particular location of the destination anchor within the destination document.

In addition to the annotation object 401 including references to a collection of resources for the anchors, a copy of the annotated content from those locations may also be included in the annotation object 401. For example, if the annotated content is to be included in the annotation object 401, the source anchor would also be represented by resource: contents 405C that includes the annotated content 409.

The annotation object 401 also describes the structure of the digital annotation. The annotation object 401 identifies the author of the digital annotation, the date and time it was created, and the date and time if it was modified.

Figure 5:
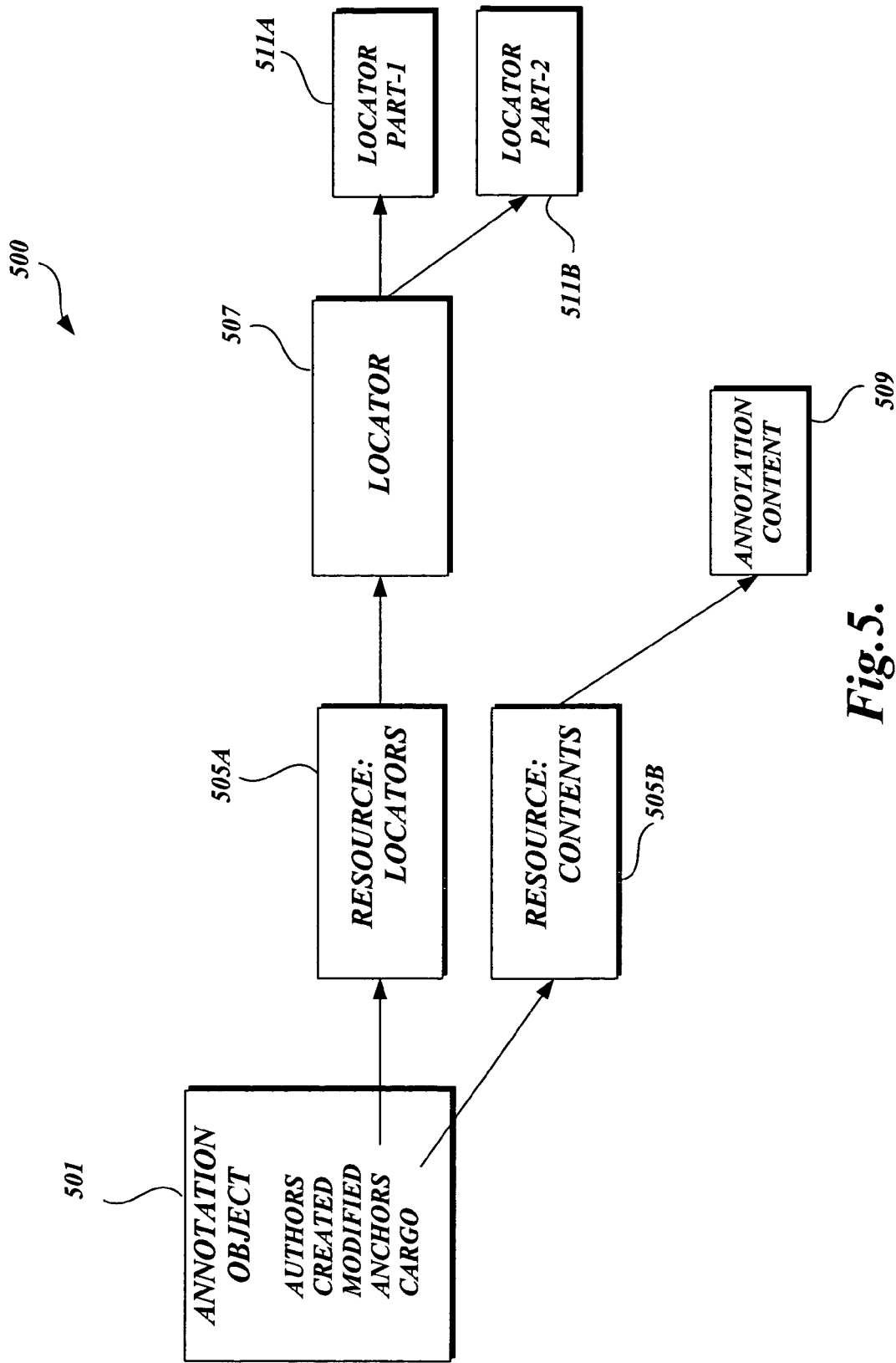
FIG. 5 is a block diagram illustrating an instance of an annotation object, as part of the annotation object graph, of a digital annotation having one anchor and annotation content, in accordance with an embodiment of the present invention.

FIG. 5 is yet another example of an instance of an annotation object 501, as part of the annotation object model 500, in accordance with an embodiment of the present invention. In this example, the annotation object 501 represents a digital annotation containing one anchor and simple annotation cargo. Digital annotations of this type include, but are not limited to, a margin bar, highlight, underline, bookmark, or symbol. For these types of digital annotations, there are generally some visual properties of the digital annotation that need to be included as annotation cargo in the content 509 of the annotation object 501. For example, included as annotation cargo in the content 509 of an annotation object 501 representative of a margin bar, is the width and color of the margin bar.

For digital annotations having one anchor and simple annotation cargo, the annotation object 501 includes resource: locators 505A for the anchor and resource: contents 505B for the cargo of the anchor. The resource: contents 505B may include the actual annotation content 509 of the digital annotation. For example, the annotation content 509 for the margin bar includes, but is not limited to, the color of the margin bar and the width of the margin bar. The resource: locators 505A includes a locator 507 with locator parts defining the digital annotation and its anchor position. Again, referring to the example of a digital margin bar annotation, the locator 507 may contain two locator parts, locator part-1 511A and locator part-2 511B. Locator part-1 511A identifies the document in which the digital annotation is contained and locator part-2 511B identifies the location of the digital annotation within the document. The annotation object 501 may also include a copy of the annotated content at the identified location of the digital annotation.

FIG. 5 is also illustrative of an annotation object 501, according to the annotation object graph 500, representative of digital annotations containing one anchor and complex annotation cargo. Such digital annotations include, but are not limited to, sticky notes, text comments, and footnotes. A sticky note is similar to the physical sticky notes that can be attached to a particular object. However, unlike physical sticky notes, electronic sticky notes can include different kinds of annotation cargo, such as rich text, ink, audio, images, video, etc.

In contrast to simple digital annotations, like margin bars and highlights, the annotation content type for digital annotations such as sticky notes is much more complex and thus, the final user experience with the digital annotation is more complex. From a representation point of view, all that changes within the annotation object 501 is the annotation content 509.

Also included in the annotation object 501 are resources 505A, 505B, and a locator 507. Still referring to the example of a digital sticky note annotation, the resource: locators 505A for the anchor includes a locator 507 having numerous locator parts 511A, 511B. In particular, locator part-1 511A identifies a document in which the digital annotation was created and locator part-2 511B identifies the particular location within that document where the sticky note is to be displayed, i.e., its anchor location. The resource: contents 505B contains the annotation cargo 509 of the sticky note, such as text within the digital sticky note annotation. The annotation object 501 for a sticky note also identifies authors, the date and time it was created, a date and time if the digital annotation was modified, a reference to the content, and a reference to the resource.

Figure 6:
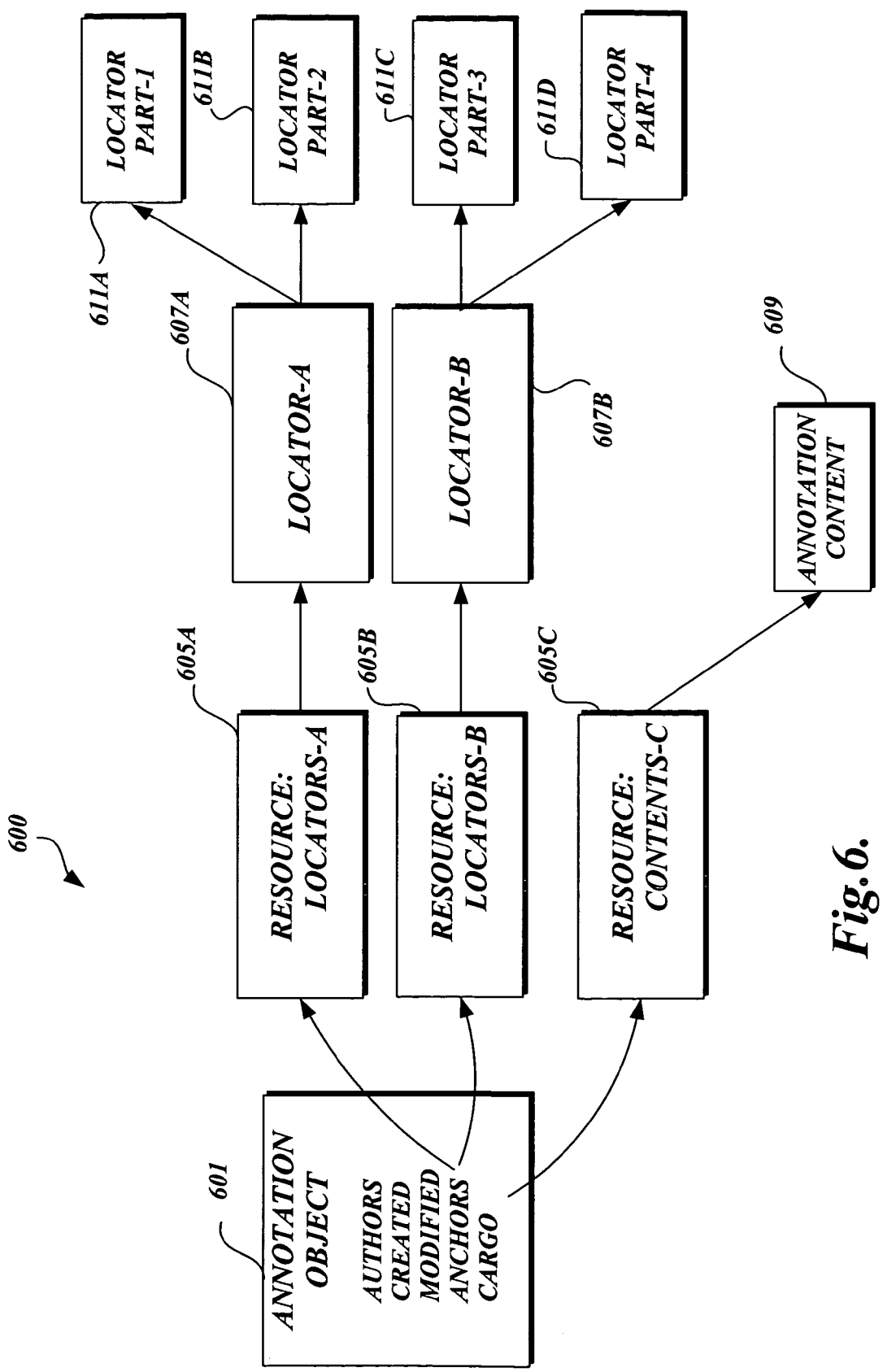
FIG. 6 is a block diagram illustrating an instance of an annotation object, as part of the annotation object graph, of a digital annotation having two or more anchors and annotation content, in accordance with an embodiment of the present invention.

FIG. 6 illustrates block diagram of an instance of an annotation object, as part of the annotation object graph, representative of digital annotations containing two or more anchors and annotation cargo. Examples of such digital annotations include, but are not limited to, annotation relationships and annotated grouping. For such digital annotations, a user might select a number of files as a group and add a comment to that group. Alternatively, a user might underline two sections in one document and connect both sections with one digital margin note annotation. Both cases may be represented by using two or more anchors and annotation cargo. The two anchors might reference resources that identify sections of the same document or identify sections of different documents.

The annotation object 601, according to the annotation object graph 600, includes a an instance of the first anchor that references a collection of resources. In particular, the source anchor references the resource: locators-A 605A and the destination anchor references the resource: locators-B 605B. The anchors may be in the same document or in different documents. Each resource 605A, 605B includes locators 607A and 607B, respectively, each having numerous locator parts identifying the document and the location within the document at which the anchor resides. In particular, locator-A 607A may include locator part-1 611A, identifying the document in which the digital annotation was created, and locator part-2 611B, identifying where in the document the first anchor of the digital annotation is positioned. Likewise, locator-B 607B includes two locator parts, locator part-3 611C, identifying the document (either the same document or a different document), and a locator part-4 611D identifying the position of the second anchor of the digital annotation within the document.

The cargo of the annotation object references the resource: contents 605C of the resources class, which contains the annotation content 609 of the digital annotation. For example, if the digital annotation was a highlight connecting two sections, the annotation content 609 may include the color and shape of the digital annotation. Additionally, the annotation object 601 defines the digital annotation itself. Such information includes, but is not limited to, an identification of the author of the digital annotation, the date and time the digital annotation was created, and a date and time if the digital annotation was modified. As with the other examples, the annotation object 601 may also contain a copy of the annotated content from the document(s).

In an alternative embodiment, if the digital annotation only points to a section of a first document and to a second document as a whole, locator-B 607B may only include one locator part. That locator part would include a reference to the second document.

For each annotation object graph, such as the examples described above, typically one locator within a resource will describe a reference to data. However, there are some cases where multiple locators for one item of data may be useful, since the data can be retrieved in multiple ways. For example, the same document may be identified in many different ways (a url, a file path, or an id for the document in a database, etc.). Likewise, you can identify a position within a document multiple different ways . . . character offset, robust anchor, paragraph hash, etc. Additionally, annotation content may also be represented in multiple formats. For example, a handwritten margin note has an ink representation, but it may also have a translated text representation and an image representation. In such an example, each type of representation may be contained within one or more resource: content.

Figure 7:
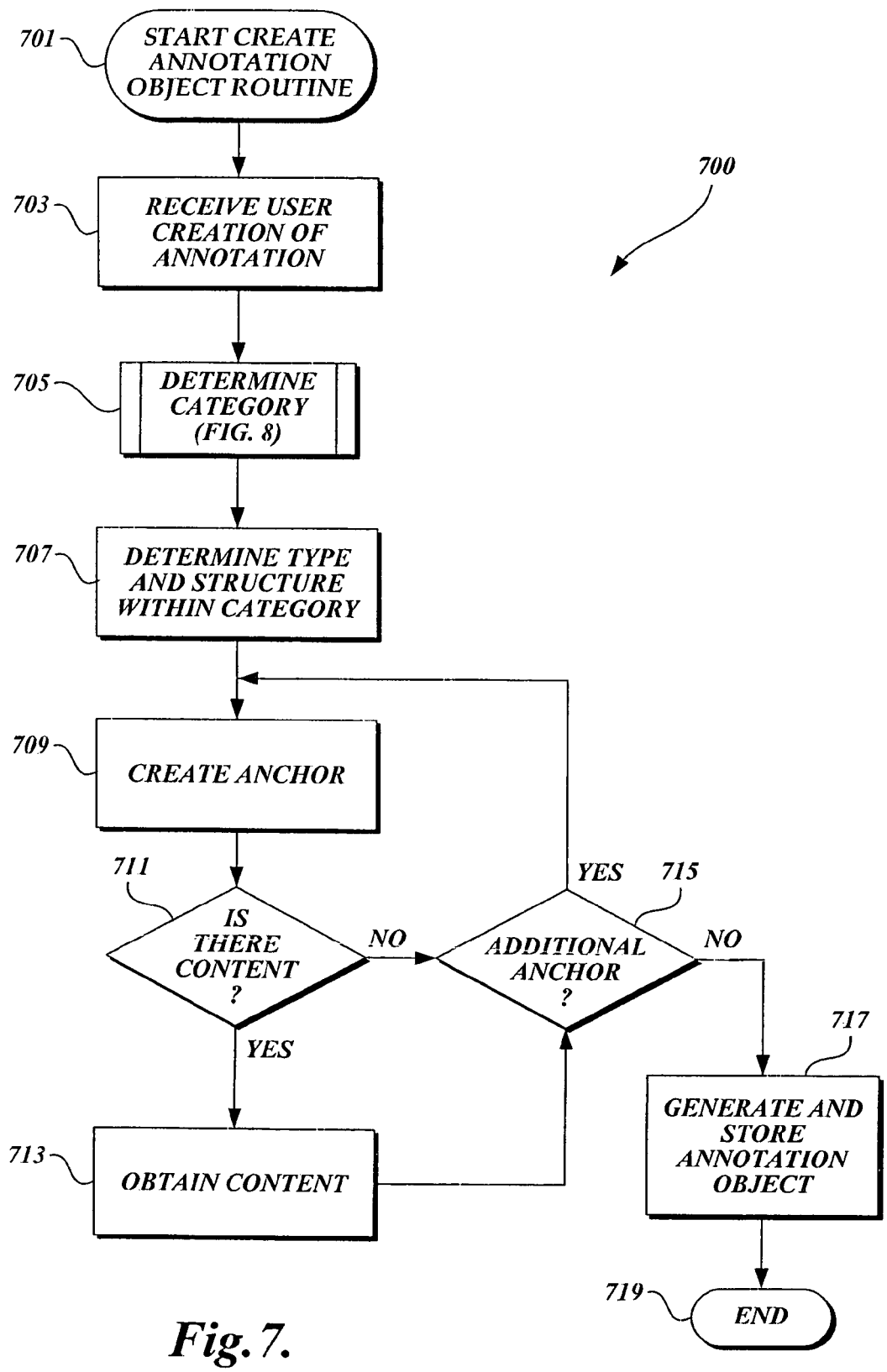
FIG. 7 is a flow diagram illustrative of an annotation object creation routine implemented by a computing device, in accordance with an embodiment of the present invention.
Figure 8:
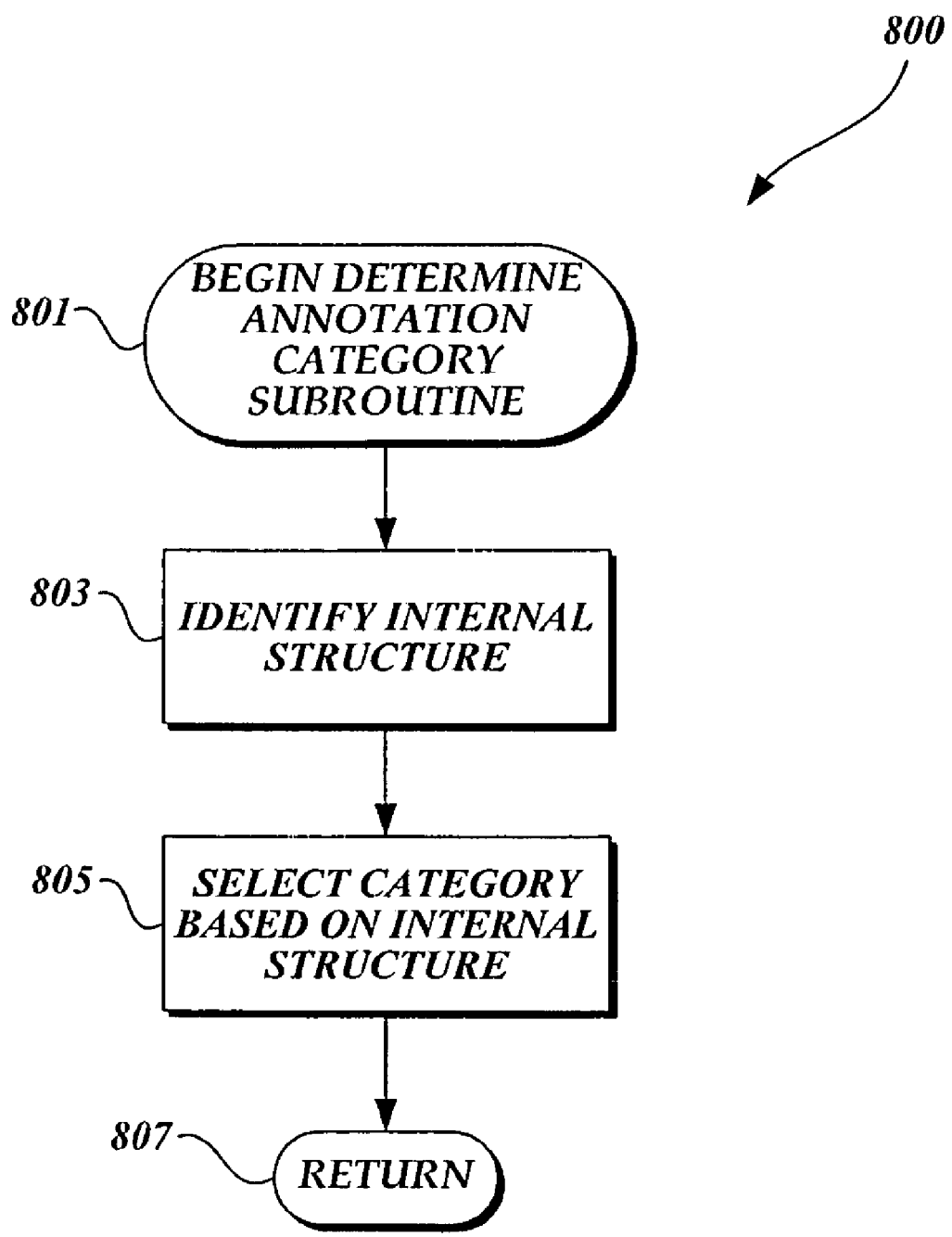
FIG. 8 is a flow diagram illustrative of a subroutine for determining an annotation category, in accordance with an embodiment of the present invention.
Figure 9:
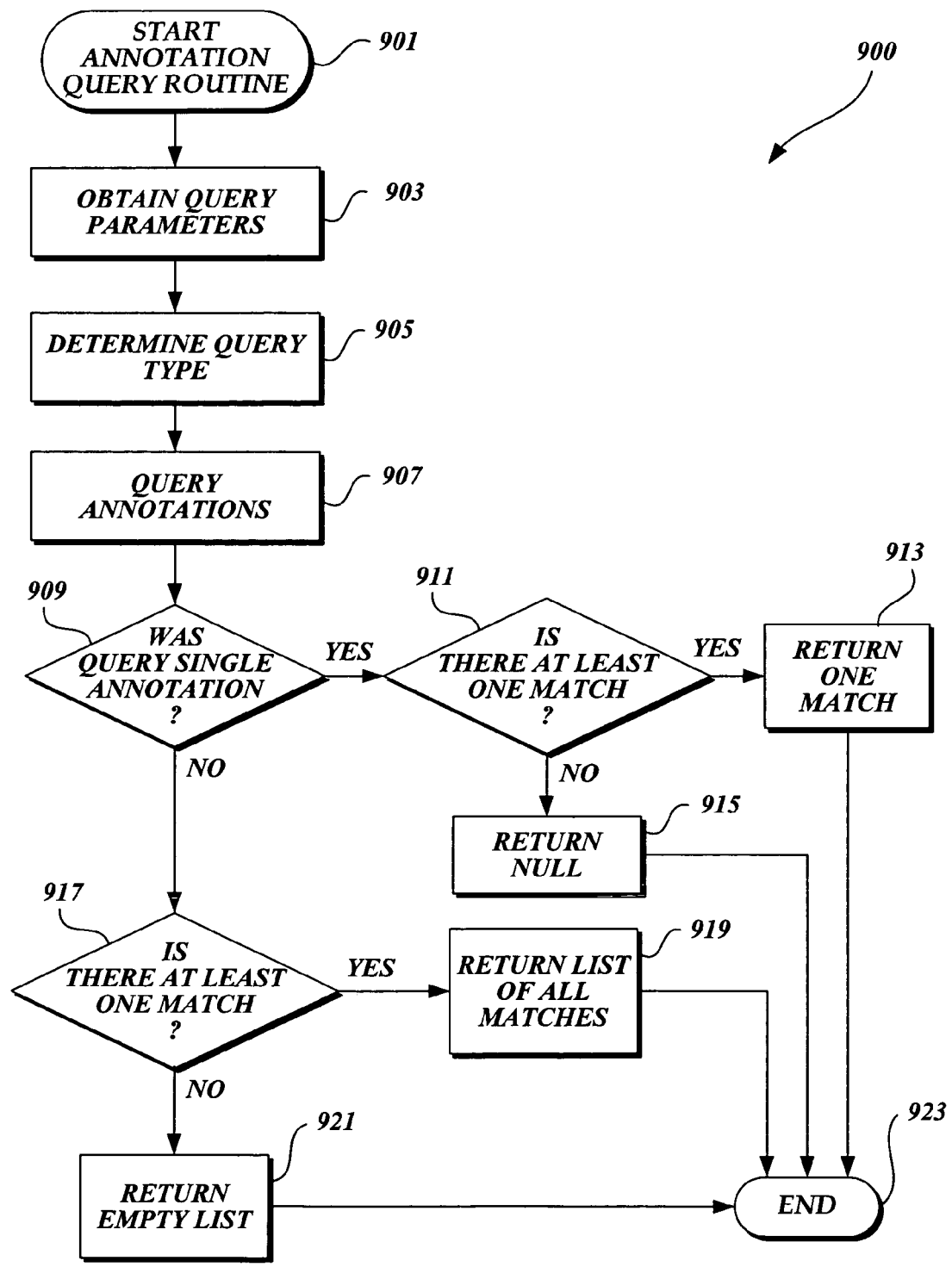
FIG. 9 is a flow diagram illustrative of a digital annotation query routine, in accordance with an embodiment of the present invention.

FIGS. 7-9 illustrate different routines that may be implemented according to embodiments of the present invention. One skilled in the relevant art will appreciate that the routines may be implemented on a single computing device or distributed to a number of computing devices. FIGS. 7-9 illustrate blocks for performing specific functions. In alternative embodiments, more or fewer blocks may be used. In an embodiment of the present invention, a block may represent a software program, a software object, a software function, a software subroutine, a software method, a software instance, a code fragment, a hardware operation, or a user operation, singly or in combination.

FIG. 7 is a flow diagram illustrative of annotation object creation routine 700 implemented by a computing device, such as computing device-1 200 (FIG. 2A), or computing devices 220 and/or 240 (FIG. 2B), in accordance with the embodiment of the present invention. The routine begins at block 701 and at block 703, a creation of a digital annotation is received. In an illustrative embodiment of the present invention, the digital annotation creation may be received from any input device that interfaces with a computing device, such as computing device-1 200. For example, an input device may be a mouse, keyboard, digital pen, etc., which is used to interact with a document that is displayed on a display of the computing device. At block 705, a determination is made as to the category type of the digital annotation that is being created. In one example, there are four categories of digital annotations: embellishments, attachments, relationships, and actions. Each of the four categories contains a number of predefined digital annotation types.

Referring to FIG. 8, a digital annotation category determination subroutine 800, corresponding to block 705 (FIG.7), implemented according to an aspect of the present invention, is described in further detail. The subroutine begins at block 801 and at block 803 the internal structure of a digital annotation is identified. The internal structure of a digital annotation may include multiple items. For example, the internal structure may identify how many anchors exist, whether annotation content exists, etc. Upon determination of the internal structure of a digital annotation at block 803, at block 805, a category for the digital annotation is selected based on the identified internal structure. At block 807, the digital annotation category routine completes, returning control to the annotation object creation routine 700 (FIG.7).

After a category has been determined, at block 707, a type within that identified category is determined for the digital annotation. The digital annotation type implies a certain, well-defined, annotation content for the cargo of the annotation object. As described above, annotation content referenced by the cargo of an annotation object may be either referenced by a resource referring to the annotation cargo, and/or actually contained in the content of the annotation object. Additionally, as described above, the anchor of the digital annotation may reference a resource that includes the annotated content from the document that is associated with the digital annotation.

For example, for a digital ink underlined annotation, the annotation type is "underlined." The anchor of the digital annotation object may refer to a resource: locator for the digital annotation identifying which piece of the source document is underlined, and refer to a resource: content that includes the actual information of the document that is underlined (annotated content). The cargo of the annotation object may reference a resource: content for the annotation content, such as an ink content object. The ink content object (annotation content) contains information as to what color the underline is and how thick it is drawn (as part of the ink object description), and the binary ink itself. An annotation object for an underline that was not done in ink may contain only an underline content object (annotation content) in the content. Such an annotation content contains information on color and thickness of the underline.

For a margin note that refers to an audio stream, the annotation type is "margin note." The representative annotation object contains two resources. One resource, a resource: locator, identifies a reference to the audio content, and the other resource, content, defines the annotation content of the digital margin note annotation. The annotation object for the margin note contains information as to the default offset in the margin relative to the anchor position, the background color used for the margin note, a collapsed or expanded state, an identification of a collapsed icon if used, etc.

The categories that may be determined in block 705 each contain numerous types, that are determined for the digital annotation in block 707. In particular, for the embellishment category, the different types of digital annotations include, but are not limited to, highlight, bracket, margin bar, underline, grouping, bookmark, and symbol. As described above, for a highlight the annotation content includes, but is not limited to, a color and a thickness of the highlight. For a margin bar, the annotation content includes, but is not limited to, color, width, and the horizontal offset from the margin of the document. With underline, the annotation content includes, but is not limited to, the color and the width of the underline. For grouping, which indicates grouping of content from a document pointed to by an anchor (e.g., a circle around some words) the annotation content includes, but is not limited to, color, width, and kind. The kind may be the kind of grouping, such as a lasso or circle. For a bookmark, the annotation content includes, but is not limited to, the size of the bookmark, the horizontal offset from the margin, and location (e.g., top, bottom, left, right).

For the attachment category, the types of digital annotations include, but are not limited to, margin note, sticky note, footnote, and endnote. Additionally, each digital annotation may include an anchor type containing one or more pieces of associated annotation content. Each of the pieces of annotation content is referenced by the annotation object cargo and identified by an annotation content type. Examples of annotation content types include, but are not limited to, text, ink, audio, image, XAML, and documents. Annotation content types such as text, ink, audio, and image are defined by their properties so that they may be used as literal content. Alternatively, if they are referenced using a locator, their type is stated as part of the locator.

For a margin note, the associated annotation content may include a background color, collapsed or expanded, offset in margin, width, and height. For a sticky note, the annotation content may include a background color, collapsed or expanded, offset from anchor, width, and height. For a footnote, the annotation content may include background color, and an anchor indicator. For an endnote, the annotation content may include background color, and an anchor indicator.

In the relationships category, the types of digital annotations include, but are not limited to, links and connectors. A link points from one digital annotation to others (potentially vice versa) and may let the user navigate to other digital annotations. A connector indicates that two digital annotations are related. For example, a line from a digital annotation to a note may be a connector. If a connector is drawn in ink, the ink is added as annotation content in a representative annotation object.

Once the annotation type has been determined, at block 709, the position of the digital annotation is identified and an anchor for the digital annotation is created. As described above, an anchor for a digital annotation is defined by resource: locators that includes a locator with one or more locator parts, and stored in the annotation object. In addition to identifying the position of the anchor, at block 709 the cargo for the anchor is generated and stored. As described above, the cargo for the anchor references resources that include the content of the annotation itself. At decision block 711, a determination is made as to whether there is annotated content from the annotated document that is to be included in the annotation object. Annotated content may be the text surrounding the digital annotation or other types of information, as described above. If there is no annotated content to be included, at decision block 715, a determination is made as to whether there are additional locations for which anchors need to be defined for the digital annotation. If it is determined at decision block 715 that there are additional anchors to be defined, the routine returns to block 709 and repeats.

Referring back to decision block 711, if it is determined that there is annotated content that is to be included in the annotation object, at block 713, the annotated content is obtained and included as a resource object of the anchor. In particular, the resources of the anchor will include a resource: content that includes the annotated content. After the annotated content is obtained, at decision block 715, the determination discussed above is made as to whether there are additional anchors to be defined. If there are no additional anchors to be defined, at block 717 an instance of an annotation object, according to the annotation object graph, representative of the digital annotation created by the user is generated and stored. After the annotation object is generated and stored, the routine completes, as illustrated by block 719.

FIG. 9 is a flow diagram illustrative of a digital annotation query routine 900 which may be performed by a computing device on an annotation store containing annotation object(s), in accordance with an embodiment of the present invention.

At block 901, the digital annotation query routine 900 begins and at block 903, query parameters from a user are obtained. Query parameters may include any type of typical search parameters, such as a keyword search or other type of content search. Additionally, the query parameters may be based upon a digital annotation type search, such as searching for digital annotations which are underlines, highlights, margin bars, an annotation category search, etc.

At block 905, the type of query to be performed is determined. For example, a query type may be a request to only return one matching digital annotation. Alternatively, it may be requested to return all matching digital annotations. After the query parameters are obtained at block 903 and the query type is determined at block 905, the annotation store is queried for annotation objects matching the query parameters.

At decision block 909 a determination is made as to whether the query type identified at block 905 was a single digital annotation query. If the query type was not a single digital annotation query, at decision block 917, a subsequent determination is made as to the number of matching annotation objects resulting from the query performed at block 907. If there are no matching query results to the query performed by digital annotation query routine 900, at block 921, the query routine returns an empty list and completes at block 923. Alternatively, if there is at least one match to the query parameters, at block 919, a list of all matches is returned and presented to the user.

Referring back to decision block 909, if it is determined that the query type requested was to return only one match, at decision block 911 it is determined whether there is at least one match returned from the query of annotation objects performed at block 907. If there is no match returned by the query, at block 915 a "no result" is presented to the user through a display and the routine completes at block 923. However, if there is at least one match, at block 913, the match is returned and displayed to the user. If only one match was requested and multiple matches were returned, the system selects only one of those matches to be returned and presents that match to the user. Selection of one match may be accomplished through any variety of selection techniques. For example, selection may be accomplished by selecting the first annotation object identified by the query and returning the corresponding digital annotation. After providing the appropriate response to a user, the digital annotation query routine 900 completes at block 923.

It will be appreciated that the embodiments described above in FIGS. 3-9 may be embodied on either a stand-alone computing device as illustrated in FIG. 1A, or in a networked environment as described in FIG. 2B, or in any other computing device configuration.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for storing a digital annotation according to an annotation object model, wherein the annotation object model includes an annotation class, a resource class, and a locator class, the method comprising:
  obtaining a notification of a creation of a digital annotation in a document;
  identifying an anchor associated with the digital annotation;
  creating a first object corresponding to the resource class, the first object including a locator, the locator including at least one locator part, wherein each of the at least one locator part is an object corresponding to the locator class of the annotation object model, and wherein the at least one locator part identifies the location of the anchor with respect to the document;
  creating a second object corresponding to the resource class, the second object including annotation content that describes the digital annotation;
  creating a third object corresponding to the resource class, the third object including annotated content, wherein the annotated content is content from the document that is proximate to the anchor associated with the digital annotation, and wherein the annotated content is less than all the content from the document;
  creating a fourth object corresponding to the annotation class, the fourth object including the first, second, and third objects; and
  storing the fourth object including the first, second, and third objects in a data store such that the annotated content from the document is stored with the associated digital annotation without being stored with the document such that upon viewing the digital annotation, the annotated content is displayed without displaying the original document.

2. The method of claim 1, further including:
  determining a category representative of the digital annotation.

3. The method of claim 2, wherein determining a category is dependent upon an internal structure of the digital annotation.

4. The method of claim 2, wherein the determined category is selected from a group of categories including an embellishment, attachment, relationship, and action.

5. The method of claim 2, further including:
  determining a type within the determined category for the digital annotation.

6. The method of claim 1, wherein the digital annotation includes a plurality of anchors.

7. The method of claim 6, wherein a first anchor is within a first item of electronic data and a second anchor is within a second item of electronic data.

8. The method of claim 6, wherein the digital annotation is a hyperlink including a source anchor and a destination anchor.

9. The method of claim 8, wherein the source anchor identifies a first location within a first item of electronic data and the destination anchor identifies a second item of electronic data.

10. The method of claim 1, wherein the at least one locator part is representative of a portion of the digital annotation.

11. The method of claim 1, wherein the fourth object further includes a relationship defining a style of the digital annotation.

12. The method of claim 11, wherein the style of the digital annotation identifies a directionality of the digital annotation.

13. The method of claim 1, wherein the annotated content includes a plurality of annotated content.

14. The method of claim 1, wherein the annotation content includes a plurality of annotation content.

15. A storage device having an annotation store for storing digital annotation data structured in accordance with an annotation object model, the annotation object model including an annotation class, a resource class, and a locator class, the annotation object model comprising:
  the resource class for creating objects corresponding to either locators or contents of a digital annotation, wherein contents comprises either annotated content or annotation content, wherein:
    an object corresponding to a locator includes at least one locator part, wherein each of the at least one locator part is an object corresponding to the locator class of the annotation object model, and wherein the at least one locator part identifies the location of an anchor of a digital annotation with respect to a document associated with the digital annotation,
    an object corresponding to annotation content includes annotation content that describes the digital annotation, and
    an object corresponding to annotated content includes annotated content comprising content from the document associated with the digital annotation, the content being proximate to the anchor associated with the digital annotation, and wherein the annotated content is less than all the content from the document; and
  the annotation class for creating an object to include one or more resource class objects associated with the digital annotation and to include further description of the digital annotation, wherein the annotation class object includes an identification of the digital annotation, and references to the one or more resource class objects associated with the digital annotation such that upon the annotation class object being stored in the annotation store, the annotated content from the document associated with the digital annotation is stored with the digital annotation without being stored with the document from which the annotated content originated, such that upon viewing the digital annotation, the annotated content is displayed without displaying the original document.

16. The storage device of claim 15, wherein the object corresponding to annotated content includes a reference to the annotated content from the document associated with the digital annotation.

17. The storage device of claim 15, wherein the digital annotation is selected from a group of digital annotations consisting of a sticky note, a text comment, a snippet, inking, a margin bar, a highlight, a symbol, an underline, a bookmark, and a hyperlink.

18. The storage device of claim 15, wherein the annotation store includes a plurality of annotation class objects.

19. The storage device of claim 15, wherein the digital annotation is created on a computing device and wherein the annotation store is located on the same computing device.

20. The storage device of claim 15, wherein the digital annotation is created on a first computing device and the annotation store is located on a second computing device.

21. The storage device of claim 20, wherein an annotation class object according to the annotation object model is generated on the first computing device and stored on the second computing device.

* * * * *